United States Patent [19]
Haruna et al.

[11] Patent Number: 4,894,400
[45] Date of Patent: Jan. 16, 1990

[54] STABILIZED SYNTHETIC POLYMER COMPOSITION

[75] Inventors: Tohru Haruna, Okegawa; Masayuki Takahashi, Tokorozawa; Kazunori Nishikawa, Matsudo, all of Japan

[73] Assignee: Adeka Argus Chemical Co. Ltd., Tokyo, Japan

[21] Appl. No.: 229,144

[22] Filed: Aug. 5, 1988

[30] Foreign Application Priority Data

Aug. 5, 1987 [JP] Japan .................. 62-195554

[51] Int. Cl.$^4$ .............................................. C08K 5/34
[52] U.S. Cl. ................................................... 524/91
[58] Field of Search .......................................... 524/91

[56] References Cited

U.S. PATENT DOCUMENTS

| | | | |
|---|---|---|---|
| 3,282,886 | 1/1966 | Gadecki | 524/91 |
| 3,629,192 | 12/1971 | Heller et al. | 524/91 |
| 4,021,405 | 5/1977 | Tucker et al. | 524/91 |
| 4,061,652 | 12/1977 | Schroefer et al. | 524/91 |
| 4,162,254 | 7/1979 | Irick, Jr. et al. | 524/91 |

Primary Examiner—John Kight
Assistant Examiner—Kriellion Morgan
Attorney, Agent, or Firm—Barnes, Kisselle, Raisch, Choate, Whittemore & Hulbert

[57] ABSTRACT

Synthetic polymer compositions comprise 100 parts by weight of a synthetic polymer and 0.001 to 5 parts by weight of a benzotriazol compound, and thus possesses improved stability.

3 Claims, No Drawings

STABILIZED SYNTHETIC POLYMER COMPOSITION

BACKGROUND OF THE INVENTION

1. Field of the Invention

The present invention relates to stabilized synthetic polymer compositions containing as a stabilizer a specified benzotriazole compound having a preventive effect on synthetic polymers against decomposition or deterioration.

2. Description of the Prior Art

Synthetic polymers such as synthetic resins and rubbers are liable to undergo decomposition or deterioration by the action of heat, light or enzymes associated with the supply of energy from the outside. If heavy metals such as Mn, Co, Cu, Fe and Pb, whether in the form of an ion or a complex in the reaction system, the decomposition or deterioration could be substantially accelerated owing to their catalytic action.

Though undesired, synthetic resins or rubbers are frequently used in the state where heavy metals are contained as impurities in them or placed in contact with them.

For the prevention of such decomposition or deterioration, improvements have been made by the use of additives such as antioxidants, stabilizers toward light but to insufficient degrees, with an extreme case of being ineffect. For example, poly-α-olefin resins, particularly polypropylene resin, recently having become increasingly used in virtue of their characteristics, to considerably prevent oxidative deterioration by the combined use of various antioxidants. The use of such a coating on copper wires or electrical insulators, or for printed wiring results in such deterioration or decrease in machinery strength, as to become practicaly unusable in several months.

In addition, electroplating on plastics has become more and more widespread. For instance, electroplating of an polypropylene object with copper consists essentially of making a first coating layer of chemical nickel directly over the object and then overlapping copper on the the first coating layer in order to prevent deterioration due to the contact between polypropylene and copper.

The use of colorants which can impart color to polypopylene or others, particularly pigments containing heavy metals, such as phthalocyanine blue, is observed to accelerate deterioration of plastics by the action of the heavy metals, which being reflected in the limited use of colorants.

For the purpose of preventing synthetic polymers from undergoing deterioration by the action of the aforenoted heavy metals, various heavy metal-inactivating agents have been proposed. For example, benzotriazole for olefin polymers is disclosed in Japanese Published Patent No. 19554/1966, N-salicylidene-N'-salicylhydrazine compounds for organic materials in the same No. 12293/1965, oxalic acid bis(salicylidene hydrazide) compounds for olefin polymers in the same No. 15466/1974, diacylhydrazide compounds for olefin polymers in Japanese Laid-open Patent No. 7088/1971, alkylhydroxyphenylalkanoylhydrazine compounds for organic materials in 27624/1972 in Japanese Published Patent No. 27624/1972, thiodialkanoic acid bis(hydrazide) compounds for olefin polymers in the same No. 23415/1970, and diacylbis(phenoxyalkylhydrazide) compounds for high molecules in the same No. 43537/1979. These compounds however produce only effects on synthetic compounds which are still far from fulfilling thoroughly the desired results.

SUMMARY OF THE INVENTION

It is an object of the invention to provide synthetic polymer compositions having superior stability toward deterioration as compared to those of the prior art, and thus to permit more wide-spread use of them.

The inventors' long study has made the discovery that a specified benzotriazole compound is dissolved or uniformly dispersed in a synthetic composition with the consequence of causing them to be very resistant to oxidative deterioration and the accelerative action of heavy metals present therein, thus the present invention has been achieved.

The present invention provides stabilized synthetic polymer compositions containing 0.001 to 5 parts by weight of at least one benzotriazole compound per 100 parts by weight of synthetic polymer, the compound being a member selected from the group consisting of those represented by the general formulae:

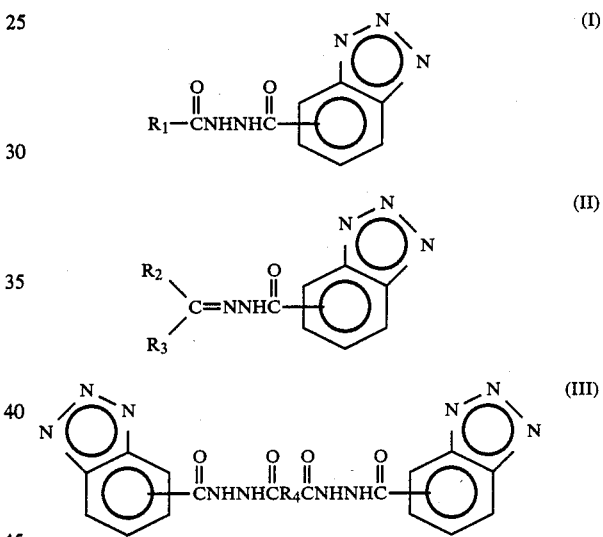

in which $R_1$ is an organic monocarboxylic radical, $R_2$ and $R_3$ are members selected from the group consisting of hydrogen, alkyl and aryl radicals, and substitutes for these radicals, and $R_4$ is an organic dicarboxylic radical.

The present invention will be described more fully hereinafter:

Suitable examples of organic monocarboxylic acids represented by $R_1COOH$ are formic, acetic, butyric, octylic, neodecanoic, lauric, stearic, hydroxystearic, benzoic, toluylic, 4-t-butylbenzoic, 3,5-di-t-butyl-4-hydroxybenzoic, and salicyclic acids; 3-methyl, 5-methyl, 5-methoxy-, 5-t-butyl, 5-t-octyl, and 5-cyclohexylsalicylic acids; 3,5-di-t-butyl-4-hydroxyphenylpropionic, 3-t-butyl-4-hydroxy-5-methylphenylpropionic, phenoxypropionic, and laurylthiopropionic acids; 3,5-di-t-butyl-4-hydroxybenzylthioacetic acid; benzotriazolecarboxylic acid, etc. Examples of alkyl radical suitable for the use as $R_2$ and $R_3$ are methyl, ethyl, propyl, butyl, hexyl, cyclohexyl, etc.

Suitable aryl radicals are, for example, phenyl, hydroxyphenyl, methylphenyl, t-butylphenyl, alkoxyphenyl, dihydroxyphenyl, phenoxyphenyl, etc.

Suitable organic dicarboxylic acids represented by HOOCR₄COOH are, for example, oxalic, malonic, succinic, glutaric, adipic, sebacic, azelaic, 1,10-decandicarboxylic, thiodipropionic, maleic, fumaric, phthalic, isophthalic, and terephthalic acids; methylenebis(salicylic acid), etc.

Typical compounds represented by the general formulae (I), (II) and (III) are summarized in Parts A, B, and C of Table 1, respectively, and X in the formulae designates t-butyl radical:

TABLE 1

Part A (I)-1

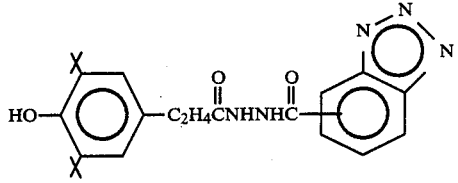

(I)-2

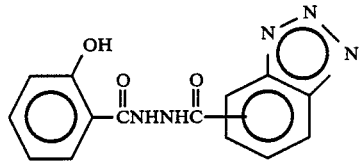

(I)-3

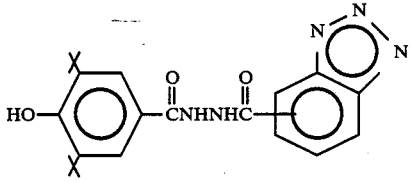

(I)-4

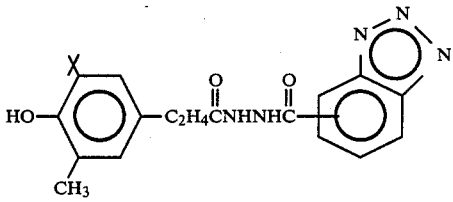

(I)-5

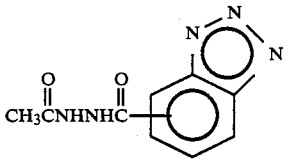

(I)-6

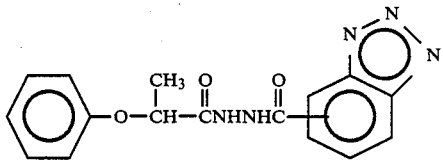

(I)-7

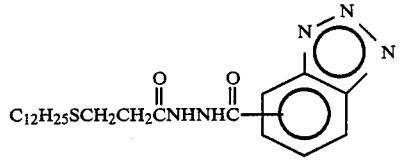

(I)-8

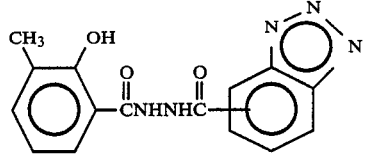

(I)-9

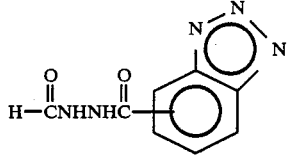

(I)-10

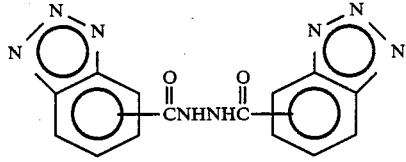

(I)-11

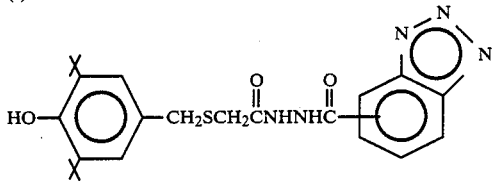

(I)-12

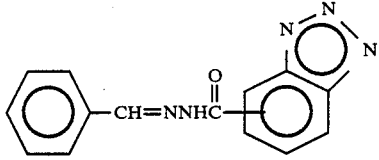

Part B (II)-1

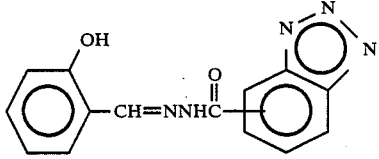

(II)-2

Part C (III)-1

TABLE 1-continued

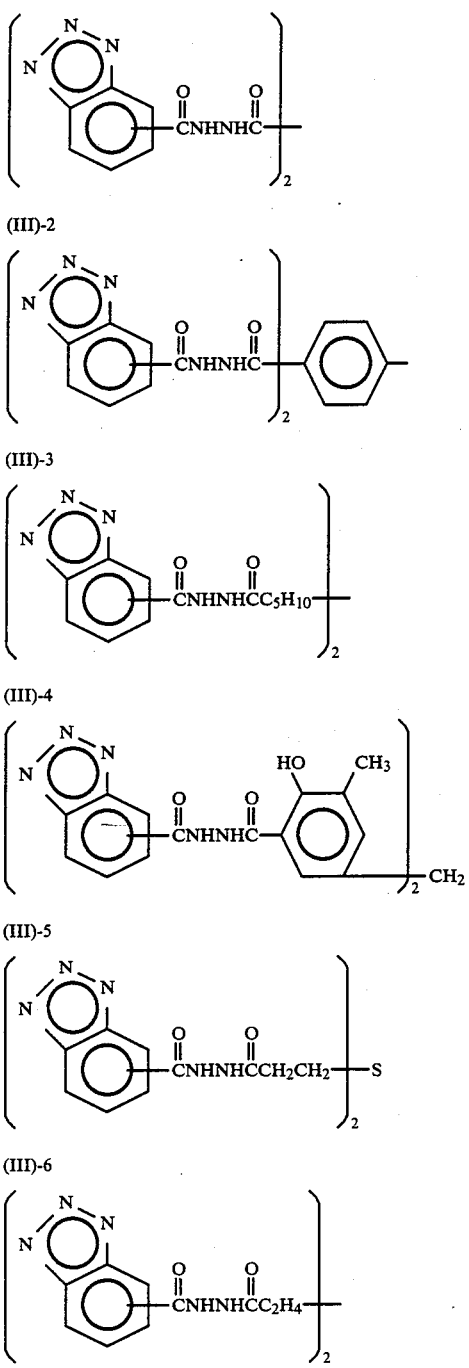

The above-mentioned compounds for use in the present invention can be prepared, for instance, in the following procedure:

A benzotriazolecarboxylic acid or a reactive derivative (ester or acid chloride) of it is allowed to react with hydrazine, followed by the addition of a reactive derivative of a monocarboxylic acid represented by formula $R_1$—COOH, aldehyde or ketone represented by $R_2$—CO—$R_3$, or a reactive derivative (ester or acid chloride) of a dicarboxylic acid represented by formula HOOC—$R_4$—COOH, thereby a compound represented by general formula (I), (II), or (III) being obtained.

An example of synthesis of a compound represented by formula (I) will be described in detail below:

Synthesis of a (1)-2 formula compound:

A quantity of 50 g of a 1 to 1 mixture of 4- and 5-position benzotriazolecaboxylic acids and 100 ml of methanol were placed in a 4-necked 300 ml-flask, and hydrogen chloride (60° C.) was passed through it for 1 hour, and refluxed for further 1 hour. After cooling, the resultant was neutralized with a 3N-sodium hydroxide aqueous solution and then precipitated in a water/ethanol solution, filtered to yield a white powdery methylester.

From the obtained methylester, 25.4 g (0.156 mols) was weighed and placed in a 4-necked 300 ml-flask. To the flask, 19.5 g (0.312 mols) of 80% hydrazine hydrate and ethanol were added and refluxed for 2 hours. After cooling, followed by filtration, a light yellow hydrazide was obtained.

Melting point: 100° C.

IR: 1650 $cm^{-1}$, 1350 $cm^{-1}$ (amide); 1550 $cm^{-1}$, (triazole).

10 g (0.061 mol) of hydrazide, 14.4 g (0.067 mol) of phenyl salicylate and 50 ml of diethyleneglycol dimethyl ether were placed in a 4-necked 200 ml-flask, and allowed to react at 180° C. under nitrogen atmosphere for 5 hours. After cooling, filtration was made, followed by washing with methanol and drying, with a yield of a light yellow powdery desired product (Melting Point: 290° C. to 295° C.; IR: 1610 $cm^{-1}$, 1480 $cm^{-1}$ (amide), and 1520 $cm^{-1}$ (triazole).

Polymers to be stabilized in accordance with the present invention are those evidently subjected to acceleration of oxidative deterioration particularly in the presence of heavy metal ions or ionizable heavy metals. Such synthetic polymers are, for example, α-olefin polymers, such as low- and high-density polyethylenes, polypropylene, polybutene-1, poly-3-methylbutene; polyolefin copolymers, such as ethylene-vinyl acetate copolymer, ethylene-propylene copolymer and ethylene-butene-1 copolymer; polyvinyl chloride, polyvinyl bromide, polyvinyl fluoride, polyvinylidene chloride, chlorinated polyethylene, chlorinated polypropylene, fluorinated polyvinylidene, brominated polyethylene, rubber chloride, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride copolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate copolymer, vinyl chloride-acrylic ester copolymer, vinyl chloride-maleic ester copolymer, vinyl chloride-methacrylic ester copolymer, vinyl chloride-acrylonitrile copolymer, halogen-containing synthetic resins, such as internal-plasticized polyvinyl chloride, petroleum resins, coumarone resin, polystyrene, polyvinyl acetate, acrylic resins; copolymers of styrene with other monomers, such as maleic anhydride, butadiene and acrylonitrile; acrylonitrile—butadiene-styrene copolymer, acrylic ester-butadiene-styrene copolymer; methacrylate resins, such as methacrylic ester-butadiene-styrene copolymer and polymethyl methacrylate; polyvinyl alcohol, polyvinyl formal, polyvinyl butyral, straight chain polyesters, polyphenylene oxide, polyamides, polycarbonates, polyacetal, polyurethane, cellulose resins, phenol resins, urea resin, malemine resin, epoxy resin, unsaturated polyester resins, silicone resins, etc. In addition rubbers such as isoprene rubber, butadiene rubber, acrylonitrile-butadiene copolymer rubber, styrene-butadiene copolymer rubber, etc.; and blends of these rubbers and the above-mentioned resins may be used.

Cross-linked copolymers such as cross-linked polyethylene produced, for example, by the action of peroxides or radiation; and foamed polystyrene prepared by means of blowing agent, and or the like, are included.

Compositions according to the present invention can be further improved in oxidation stability by the addition of phenol-type antioxydants, of which examples are 2,6-ditertiary butyl-p-cresol, stearyl-(3,5-di-methyl-4-hydroxybenzyl)thioglycolate, stearyl-β-(4-hydroxy-3,5-di-tertiary butylphenyl)propyonate, distearyl-3,5-ditertuary butyl-4-hydroxybenzylphosphonate, 2,4,6-tris(3',5'-di-tertiary butyl-4'-hydroxybenzylthio)-1,3,5-triazine, distearyl(4-hydroxy-3-methyl-5-tertiary butyl)-benzyl malonate, 2,2'-methylenebis(4-methyl-6-tertiary butylphenol), 4,4'-methylenebis(2,6-di-tertiary butylphenol), 2,2'-methylenebis[6-(1-methylcyclohexyl)p-cresol], bis[3,5-bis(4-hydroxy-3-tertiary butylphenyl)-butyric acid]glycol ester, 4,4'-butylidenebis(6-tertiary butyl-m-cresol), 2,2'-ethylidenebis(4,6-di-tertiary butylphenol), 2,2'-ethylidenebis(4-secondary butyl-6-tertiary butylphenol), 1,1,3-tris(2-methyl-4-hydroxy-5-tertiary butylphenyl)butane, bis[2-tertiary butyl-4-methyl-6-(2-hydroxy-3-tertiary butyl-5-methylbenzyl)phenyl]terephthalate, 1,3,5-tris(2,6-dimethyl-3-hydroxy-4-tertiary butyl)benzylisocyanurate, 1,3,5-tris(3,5-di-tertiary butyl-4-hydroxybenzyl)-2,4,6-trimethylbenzene, 2,6-diphenyl-4-octadecyloxyphenol, tetrakis[methylene-3-(3,5-dipertiary butyl-4-hydroxyphenyl)propionate]methane, 1,3,5-tris(3,5-di-tertiary butyl-4-hydroxybenzyl)isocyanurate, 1,3,5-tris(3,5-di-tertiary butyl-4-hydroxyphnyl)propionyloxyethytl]isocyanurate, 2-octylthio-4,6-di(4-hydroxy-3,5-di-tertiary butyl)phenoxy-1,3,5-triazine, 4,4'-thiobis(6-tertiary butyl-m-cresol), 2-tertiary butyl-4-methyl-6-(2-hydroxy-3-tertiary butyl-5-methylbenzyl)phenylacrylate, triethyleneglycolbis[β-(3-tertiary butyl-4-hydroxy-5-methylphenyl)propionate, 3,9-bis[1,1-dimethyl-2-{β-(3-tertiary butyl-4-hydroxy-5-methylhenyl)propionyloxy}ethyl]-2,4,8,10-tetraoxaspiro[5,5]undecane, etc.

The stability of compositions according to the invention against oxidation can be improved by the addition of sulfur-containing antioxidants, of which examples are dialkylthiopropionates, such as dilauryl-, dimylistyl- and distearylthiopropyonates; and esters, such as pentaerythritoltetrakis(dodecylthiopropriotate), of dialkylthiodipropionic such as butyl-, octyl-, lauryl- and stearylthiopropionic acids, and polyhydric alcohols, such as glycerin, trimethylolethane, trimethylolpropane, and pentaerythritol, trishydroxyethylisocynurate.

Besides phosphorous-containing compounds such as phosphite can be added to compositions according to the present invention with the consequence of improvement in light resistance and high temperature stability. These compounds are, for example, trioctylphosphite, trilaurylphosphite, tridecylphosphite, octyl-diphenylphosphite, tris(2,4-di-tertiary butylphenyl)phosphite, triphenylphosphite, tris(butoxyethyl)phosphite, tris(-nonylphenyl)phosphite, distearylpentaerythritoldiphosphite, tetra(tridecyl)-1,1,3-tris(2-methyl-5-tertiary butyl-4-hydroxyphenyl)butanediphosphite, tetra($C_{12}$ to $C_{15}$-mixed alkyls)-4,4'-isopropylidenediphenyldiphosphite, tetra(tridecyl)-4,4'-butylidenebis(3-methyl-6-tertiary butylphenol)diphosphite, tris(3,5-di-tertiary butyl-4-hydroxyphenyl)phosphite, tris(mono/di-mixed nonylphenol)phosphite, hydrogenated-4,4'-isopropylidenediphenolpolyphosphite, bis(octylphenyl).bis[4,4'-btylidenebis(3-methyl-6-tertiary butylphenol)].1,6-hexanedioldiphosphite, Phenyl.4,4'-isopropylidenediphenol.pentaerythritoldiphosphite, bis(2,4-di-tertiary butylphenyl)pentaerythritoldiphosphite, bis(2,6-di-tertiary butyl-4-methylphenyl)pentaerythritoldiphosphite, tris[4,4'-isopropylisdenebis(2-tertiary butylphenol)-phosphite, phenyl.diisodecylphosphite, di(nonylphenyl)pentaerythritoldiphosphite, tris(1,3-distearoyloxyisopropyl)phosphite, 4,4'-isopropylidenebis(2-tertiary butylphenol).di(nonylphenyl)phosphite, 9,10-di-hydro-9-oxa-10-phosphaphenanthrene-10-oxide, tetrakis(2,4-di-tertiary butylphenyl)-4,4'-biphenylenediphosphite, etc.

The addition of stabilizer toward light can contribute to further increase light resistance of compositions according to the present invention. Suitable stabilizers, for this purpose are, for example, hydroxybenzophenones, such as 2-hydroxy-4-methoxybenzophnone, 2-hydroxy-4-n-octoxybenzophenone, 2,2'-di-hydroxy-octoxybezophenone, 2,2'-dihydroxy-4-methoxybenzophenone, and 2,4-dihydroxybenzophenone; benzotriazols, such as 2-(2'-hydroxy-3'-t-butyl-5'-methylphenyl)-5-chlorobenzotriazole, 2-(2'-hydroxy-3',5'-di-t-butylphenyl)-5-chlorobenzotriazol, 2-(2'-hydroxy-5'-methylphenyl)benzotriazol and 2-(2'-hydroxy-3',5'-di-t-amylphenyl)benzotriazol; benzoates, such as phenylsalicylate, p-t-butylphenylsalicylate, 2,4-di-t-butylphenyl-3,5-di-t-butyl-4-hydroxybenzoate and hexadecyl-3,5-di-t-butyl-4-hydroxybenzoate; nickel compounds, such as 2,2'-thiobis(4-t-octylphenol)Ni, [2,2'-thiobis(4-t-octylphenolate)]-n-butylamine Ni, and (3,5-di-t-butyl-4-hydroxybenzyl)monoethyl phosphate Ni; substituted acrylonitriles, such as α-cyano-β-methyl-β-(p-methoxyphenyl)methyl acrylate; oxalic acid dianilides, such as N-2-ethylphenyl-N'-2-ethoxy-5-tertiary butylphenyloxalic acid diamide and N-2-ethylphenyl-N'-2-ethoxyphenyloxalic acid diamide; and piperidine compounds, such as bis(2,2,6,6-tetramethyl-4-piperidyl)sebacate, bis(1,2,2,6,6-pentamethyl-4-piperidyl)sebacate, bis(1,2,2,6,6-tetramethyl-4-piperidyl)-2-butyl-2-(3,5-di-tertiary butyl-4-hydroxybenzyl)malonate, tris(2,2,6,6-tetramethyl-4-piperidyl)nitrotriacetate, tetrakis(2,2,6,6-tetramethyl-4-piperidyl)butane-1,2,3,4-tetracarboxylate, Condensed N-hydroxyethyl-2,2,6,6-tetramethyl-4-piperidynol/dimethyl succinate, condensed cyanuric chloride/tertiary octylamine/1,6-bis(2,2,6,6-tetramethyl-4-piperidylamino)hexane. In addition, compositions according to the present invention can contain other substances, such as nucleating agents, metallic soaps, organic stannous compounds, plasticizers, epoxy compounds, pigments, fillers, blowing agents, antistatic agents, flame retardant agents, lubricants and other additives.

The invention will be further illustrated by examples, which are not limitative to the present invention.

EXAMPLE 1

To evaluate the effect of the compound according to the invention on polyethylene, the following composition:

| | parts (by weight) |
|---|---|
| Low-density polyethylene (Milason 3530; ™ of Mitsui Polychemical Co., Ltd.) | 100 |
| Tetrakis[methylene-3(3,5-di-tertiary butyl-4-hydroxyphennyl)propionate]methane | 0.15 |
| Sample (Table 2) | 0.10 | was rolled at 160° C. for 5 minutes and then pressed at 160° C. and 200 atms for 3 hours to obtain sheets of 0.5 mm in thickness. Between two sheets, a 60 mesh copper net was interposed and pressed at 160° C. and 200 atms for 3 minutes, to form a sheet of 1 mm thick.

The sheet product was placed ina gear oven kept at 150° C. and deterioration time was measured. The yielded results are shown in Table 2.

TABLE 2

| (A) Comparative examples | | |
|---|---|---|
| No. | Sample | Deterioration time (hours) |
| 1-1 | No | 230 |
| 1-2 | N, N'—bissalicyloyl-hydradine | 490 |
| 1-3 | N, N'—bissalicyloyladipic acid dihydrazide | 520 |
| 1-4 | N—salicyloyl-N'—benzoil-hydradine | 460 |

| (B) Examples of the present invention | | |
|---|---|---|
| No. | Sample | Deterioration time (hours) |
| 1-1 | (I)-1 compound (Table 1) | 730 |
| 1-2 | (I)-2 compound (Table 1) | 770 |
| 1-3 | (I)-6 compound (Table 1) | 700 |
| 1-4 | (I)-10 compound (Table 1) | 750 |
| 1-5 | (II)-1 compound (Table 1) | 660 |
| 1-6 | (III)-1 compound (Table 1) | 720 |
| 1-7 | (III)-4 compound (Table 1) | 750 |
| 1-8 | (III)-6 compound (Table 1) | 700 |

EXAMPLE 2

To evaluate the effect of the compound according to the invention on polypropylene, the following composition:

| | parts (by weight) |
|---|---|
| Polypropylene (Profax 6501; U. S. Harcules, Corp.) | 100 |
| Stearyl-β-(3,5-di-tertiary butyl-4-hydroxyphenyl)propionate | 0.3 |
| Dilaurylthiodipropionate | 0.3 |
| Sample (Table 3) | 0.3 | was extruded at 250° C. and 20 rpm to form pellets, which then were pressed at 180° C. and 250 atms for 5 minutes to obtain sheets of 0.5 mm in thickness. To both sides of a sheet, copper foils were closely adhered, and heated in an oven of which temperature was kept at 160° C., thus deterioration time was measured. The yielded results are set forth in Table 3.

TABLE 3

| (A) Comparative examples | | |
|---|---|---|
| No. | Sample | Deterioration time (hours) |
| 2-1 | No | 80 |
| 2-2 | N, N'—bissalicyloyl-hydradine | |

TABLE 3-continued

| 2-3 | N, N'—bissalicyloyladipic acid dihydrazide | 1120 |
|---|---|---|
| 2-4 | N—salicyloyl-N'—benzoil-hydradzine | 960 |

| (B) Examples of the present invention | | |
|---|---|---|
| No. | Sample | Deterioration time (hours) |
| 2-1 | (I)-2 compound (Table 1) | 2320 |
| 2-2 | (I)-4 compound (Table 1) | 2140 |
| 2-3 | (I)-6 compound (Table 1) | 2250 |
| 2-4 | (I)-9 compound (Table 1) | 2020 |
| 2-5 | (I)-12 compound (Table 1) | 2080 |
| 2-6 | (II)-2 compound (Table 1) | 1950 |
| 2-7 | (III)-2 compound (Table 1) | 2000 |
| 2-8 | (III)-6 compound (Table 1) | 2100 |

EXAMPLE 3

The following composition:

| | parts (by weight) |
|---|---|
| Polypropylene (Profax 6501) | 70 |
| Talc | 30 |
| Calcium stearate | 0.05 |
| 1,3,5-tris(3,5-di-tertiary butyl-4-hydroxybenzyl)isocyanurate | 0.2 |
| Pentaerythritoltetrakis(dodecylthio-propionate) | 0.2 |
| Sample (Table 4) | 0.2 | was extruded at 250° C. and 20 rpm and then injected at 250° C. to mold sheets of 0.5 mm in thickness. To both sides of a molded sheet, copper foils are closely adhered, and heated in an oven of which temperature was kept at 160° C., thus deterioration time being measured. The yielded results are set forth in Table 4.

TABLE 4

| (A) Comparative examples | | |
|---|---|---|
| No. | Sample | Deterioration time (hours) |
| 3-1 | No | 40 |
| 3-2 | N, N'—bissalicyloyl-hydradine | 730 |
| 3-3 | N, N'—bissalicyloyladipic acid dihydrazide | 730 |
| 3-4 | N—salicyloyl-N'—benzoil-hydradine | 660 |

| (B) Examples of the present invention | | |
|---|---|---|
| No. | Sample | Deterioration time (hours) |
| 3-1 | (I)-2 Compound (Table 1) | 950 |
| 3-2 | (I)-3 compound (Table 1) | 920 |
| 3-3 | (I)-5 compound (Table 1) | 890 |
| 3-4 | (I)-10 compound (Table 1) | 950 |
| 3-5 | (I)-11 compound (Table 1) | 900 |
| 3-6 | (III)-1 compound (Table 1) | 900 |
| 3-7 | (III)-3 compound (Table 1) | 920 |

EXAMPLE 4

A mixture of 100 parts by weight of ABS resin (Blendex 111), 0.5 parts by weight of zinc stearate, 5 parts by weight of titanium dioxide, and 0.3 parts by weight of a sample was rolled, and then pressed to form sheets of 1 mm in thickness. To both sides of an obtained sheet, copper foils were closely adhered, and heated for 1 hour in an oven of which temperature was kept at 180°

C. Then color change of the sheet was scored using the scale having 10 grades between light yellowish white "1" and dark brown "10", and the yielded results are set forth in Table 5.

TABLE 5

| (A) Comparative examples | | |
|---|---|---|
| No. | Sample | Color change |
| 4-1 | No | 10 |
| 4-2 | N, N'—bissalicyloy-hydradine | 6 |
| 4-3 | N, N'—bissalicyloyladipic acid dihydrazide | 6 |
| 4-4 | N—salicyloyl-N'—benzoil-hydradine | 7 |

| (B) Examples of the present invention | | |
|---|---|---|
| No. | Sample | Color change |
| 4-1 | (I)-2 compound (Table 1) | 1 |
| 4-2 | (I)-3 compound (Table 1) | 1 |
| 4-3 | (I)-7 compound (Table 1) | 2 |
| 4-4 | (I)-10 compound (Table 1) | 1 |
| 4-5 | (II)-2 compound (Table 1) | 3 |
| 4-6 | (III)-5 compound (Table 1) | 2 |
| 4-7 | (III)-6 compound (Table 1) | 1 |

What is claimed is:

1. A synthetic polymer composition which comprises 100 parts by weight of a synthetic polymer and 0.001 to 5 parts by weight of at least one of benzotriazol compounds represented by the formulae (I), (II) and (III):

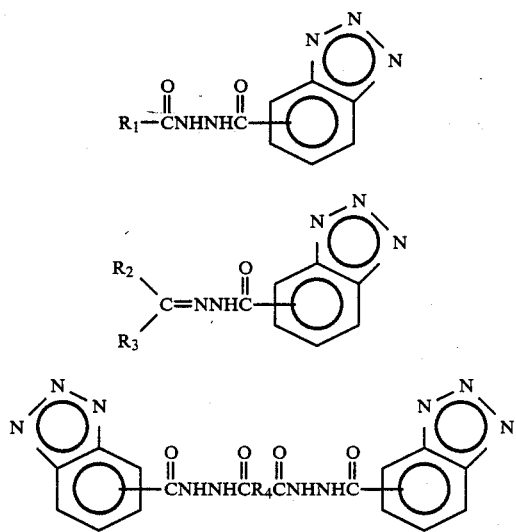

in which $R_1$ is an organic monocarboxylic radical selected from the group consisting of formic acid, acetic acid, butyric acid, octylic acid, neodecanoic acid, lauric acid, stearic acid, hydroxystearic acid, benzoic acid, toluylic acid, 4-t-butylbenzoic acid, 3,5-di-t-butyl-4-hydroxybenzoic acid, salicylic acid; 3-methyl-salicylic acid, 5-methyl-salicylic acid, 5-methoxy-salicylic acid, 5-t-butyl-salicylic acid, 5-t-octyl-salicylic acid, 5-cyclohexyl-salicylic acid; 3,5-di-t-butyl-4-hydroxyphenyl-propionic acid, 3-t-butyl-4-hydroxy-5-methyl-phenylpropionic acid, phenoxypropionic acid and laurylthiopropionic acid; 3,5-di-t-butyl-4-hydrozybenzyl-thioacetic acid and benzotriazolecarboxylic acid, $R_2$ and $R_3$ are members selected from the group consisting of hydrogen, alkyl and aryl radicals, and $R_4$ is an organic dicarboxylic radical.

2. A composition as claimed in claim 1 wherein said synthetic polymer is selected from the group consisting of low- and high-density polyethylenes, polypropylene, polybutene-1, poly-3-methylbutene, ethylene-vinyl acetate copolymer, ethylene-propylene copolymer and ethylene-butene-1 copolymer; polyvinyl chloride, polyvinyl bromide, polyvinyl fluoride, polyvinylidene chloride, chlorinated polyethylene, chlorinated polypropylene, fluorinated polyvinylidene, brominated polyethylene, rubber chloride, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride copolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate copolymer, vinyl chloride-acrylic ester copolymer, vinyl chloride-maleic ester copolymer, vinyl chloride-methacrylic ester copolymer, vinyl chloride-acrylonitrile copolymer, internal-plsticized polyvinyl chloride, petroleum resins, coumarone resin, polystyrene, polyvinyl acetate, acrylic resin, copolymers of styrene with other monomers, such as maleic anhydride, butadiene and acrylonitrile; acrylonitrile—butadiene-styrene copolymer, acrylic ester-butadiene-styrene copolymer, methacrylate resins, such as methacrylic ester-butadiene-styrene copolymer and polymethyl methacrylate; polyvinyl alcohol, polyvinyl formal, polyvinyl butyral, straight chain polyesters, polyphenylene oxide, polyamides, polycarbonates, polyacetal, polyurethane, cellulose resins, phenol resins, urea resin, malamine resin, epoxy resin, unsaturated polyester resins, silicone resins, isoprene rubber, butadiene rubber, acrylonitrile-butadiene copolymer rubber, and styrene-butadiene copolymer rubber.

3. A composition as claimed in claim 1, which further comprises an antioxidant.

* * * * *